United States Patent [19]

Whittington et al.

[11] 4,073,209

[45] Feb. 14, 1978

[54] METHOD AND CIRCUITRY FOR DIGITAL-ANALOG FREQUENCY GENERATION

[75] Inventors: Billy J. Whittington; Alan B. Welsh, both of Jasper; Timothy L. Burns, French Lick, all of Ind.

[73] Assignee: Kimball International, Inc., Jasper, Ind.

[21] Appl. No.: 675,323

[22] Filed: Apr. 9, 1976

[51] Int. Cl.$^2$ .............................................. G01H 1/02

[52] U.S. Cl. ...................................... 84/1.24; 84/1.01; 84/1.03; 84/1.17

[58] Field of Search ...................... 84/1.24, 1.25, 1.01, 84/1.03, DIG. 4, DIG. 8, DIG. 20, 1.17

[56] References Cited

U.S. PATENT DOCUMENTS

| | | | |
|---|---|---|---|
| 3,234,485 | 2/1966 | Graser | 84/1.25 X |
| 3,288,904 | 11/1966 | George | 84/1.01 |
| 3,515,792 | 6/1970 | Deutsch | 84/1.24 X |
| 3,538,804 | 11/1970 | George | 84/1.01 |
| 3,795,755 | 3/1974 | Uchiyama | 84/1.03 |
| 3,809,792 | 5/1974 | Deutsch | 84/DIG. 4 X |
| 3,854,366 | 12/1974 | Deutsch | 84/1.03 X |
| 3,929,053 | 12/1975 | Deutsch | 84/1.24 |
| 3,930,429 | 1/1976 | Hill | 84/1.01 |
| 3,965,789 | 6/1976 | Pearlman | 84/1.24 |
| 3,986,423 | 10/1976 | Rossum | 84/1.03 |

*Primary Examiner*—Ulysses Weldon
*Attorney, Agent, or Firm*—Albert L. Jeffers; John F. Hoffman

[57] ABSTRACT

A method and circuitry for frequency generation, especially for electronic organs, in which a digital signal is developed by the actuation of an element such as a key of an organ keyboard. The digital signal is converted to a respective voltage signal and the voltage signal is employed to control a voltage controlled oscillator which supplies a signal corresponding in frequency to the actuation of the aforesaid element. An organ provided with a system for frequency generation according to the present invention can be operated monophonically or polyphonically and is capable of producing desirable effects, including celeste and portamento effects.

23 Claims, 4 Drawing Figures

METHOD AND CIRCUITRY FOR DIGITAL-ANALOG FREQUENCY GENERATION

The present invention relates to the generation of a range of frequencies, as in connection with an electronic organ.

The generation of a suitable range of frequencies for electronic organs has always presented certain problems and expenses. In many organs, a tone generator is provided for each scale note and the frequency is divided down to obtain the several ranks desired. In this case, the several oscillators, usually twelve, must be kept in tune to produce the proper frequencies.

In another case, an oscillator is provided which, through frequency division, supplies the frequencies for the highest octave of the keyboard and these frequencies are divided down to obtain the several ranks of frequencies desired.

In this last case, only a single master oscillator is required but expensive circuitry is necessary to obtain the frequencies desired.

According to the present invention, the frequencies desired for an electronic organ are obtained through the use of voltage controlled oscillators, with each oscillator having the capability of producing the entire range of frequencies required for an organ keyboard.

BRIEF SUMMARY OF THE INVENTION

The circuit of the present invention relates to an improved method of producing tone signals of correct frequencies for instruments, such as electronic organs, wherein certain tone signals from a group of predetermined tone signals are selected in response to operator actuated means, such as a keyboard.

In the circuit of the present invention, a group of voltage controlled oscillators are employed to produce the tone signals. Each of the voltage controlled oscillators (VCO) is capable of producing the entire range of frequencies required for an organ having a sixty-one note keyboard. Frequency dividers may, of course, be employed together with the VCO's, if desired. The control voltage applied to the VCO, consists of an analog voltage, which is produced by a digital to analog converter (DAC). The digital input to the DAC is developed by a multiplexing circuit which produces a respective six bit digital word in response to the depression of a key on the keyboard.

The circuit of the present invention is adapted to provide for polyphonic operation by providing a respective VCO and a control voltage therefor for each of several notes to be played at the same time.

For polyphonic operation, time sharing techniques may be employed.

The nature of the present invention will become more apparent upon reference to the following detailed specification taken in connection with the accompanying drawings in which.

Figure 4:
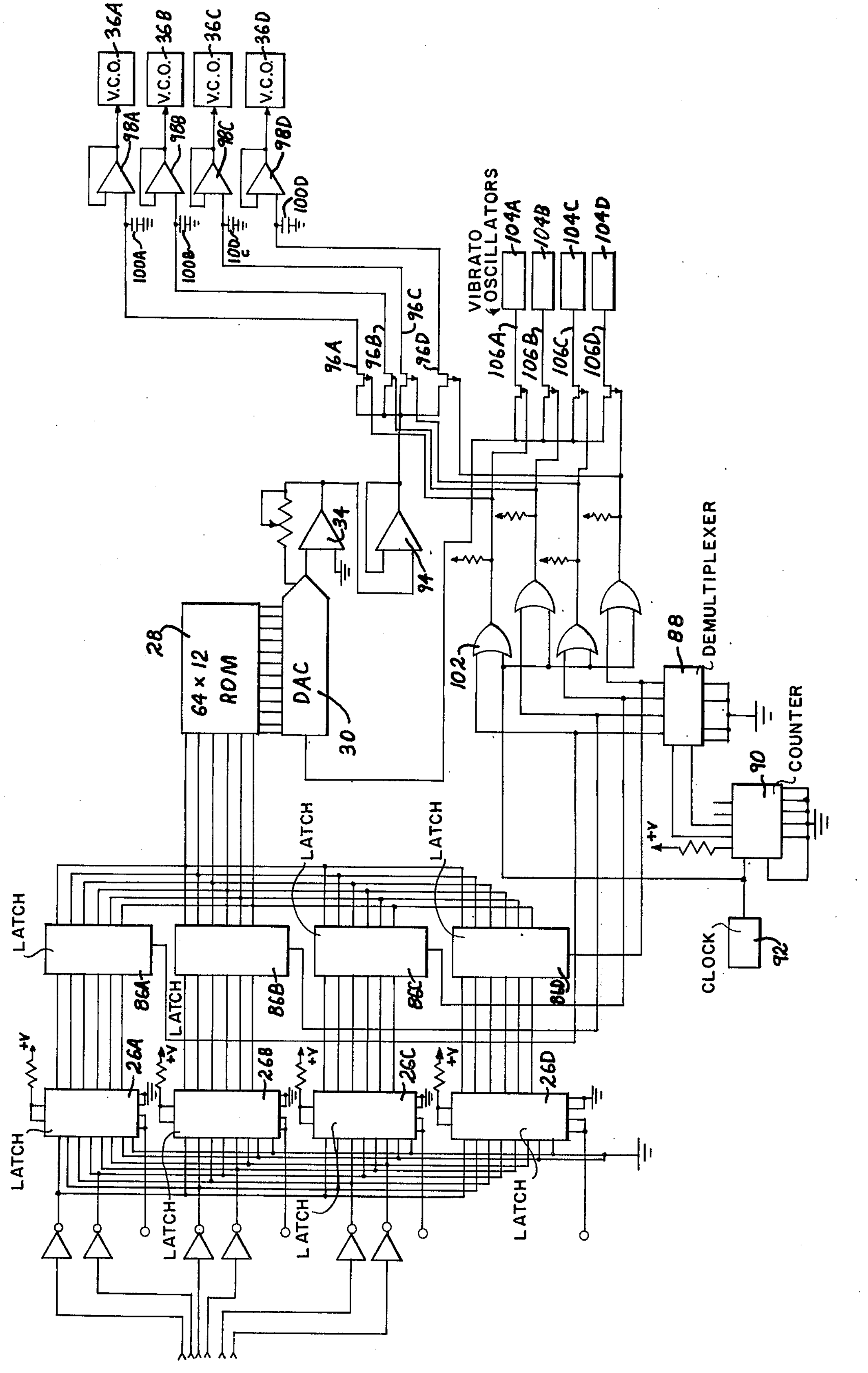

FIG. 4 schematically shows a modification in which time sharing is employed.

Figures 2, 5:
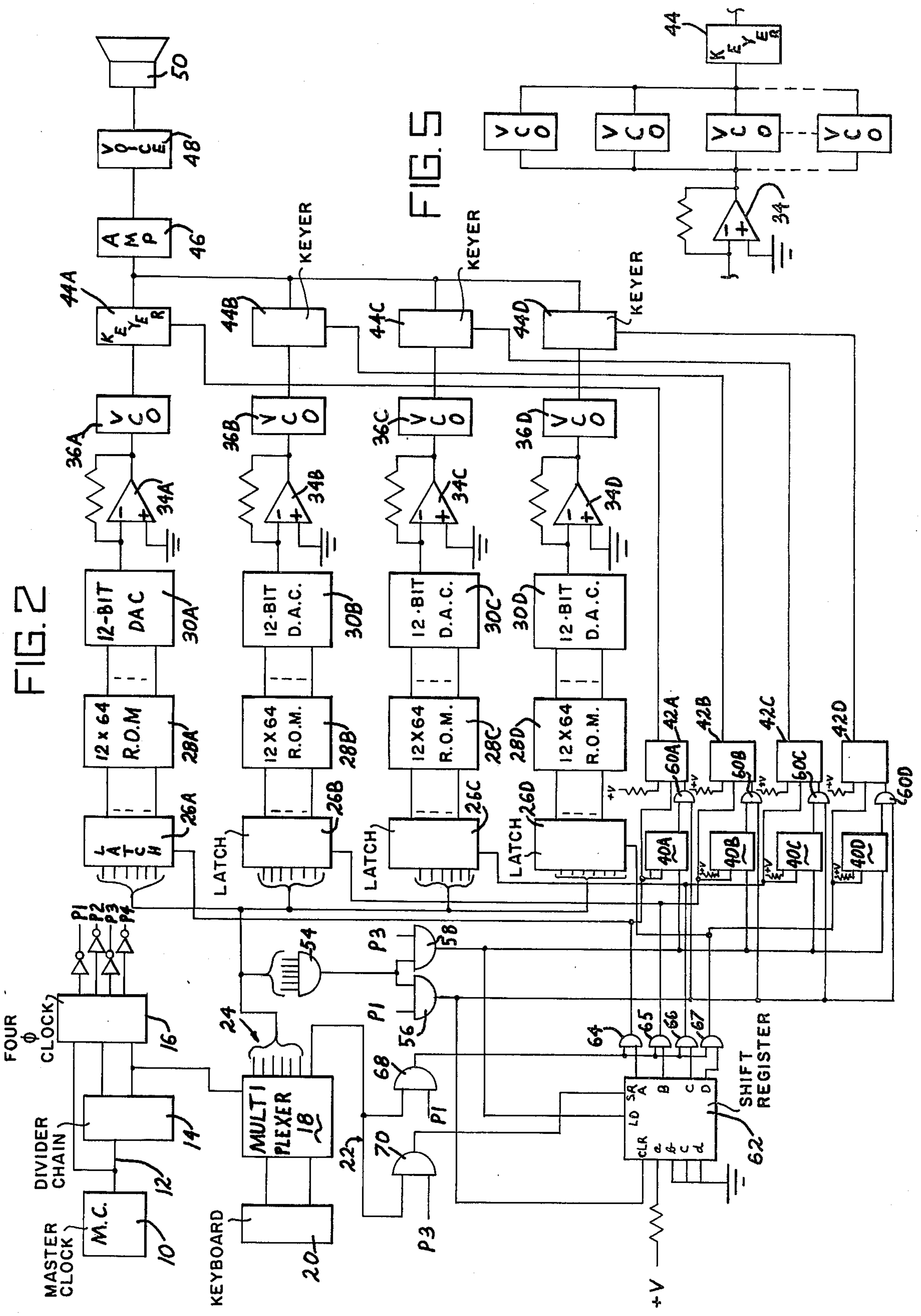
FIG. 2 is a simplified schematic view showing the circuit of the present invention in a polyphonic system.

FIG. 5 schematically shows a modification for producing a celeste effect.

DETAILED DESCRIPTION OF THE INVENTION

Figure 1:
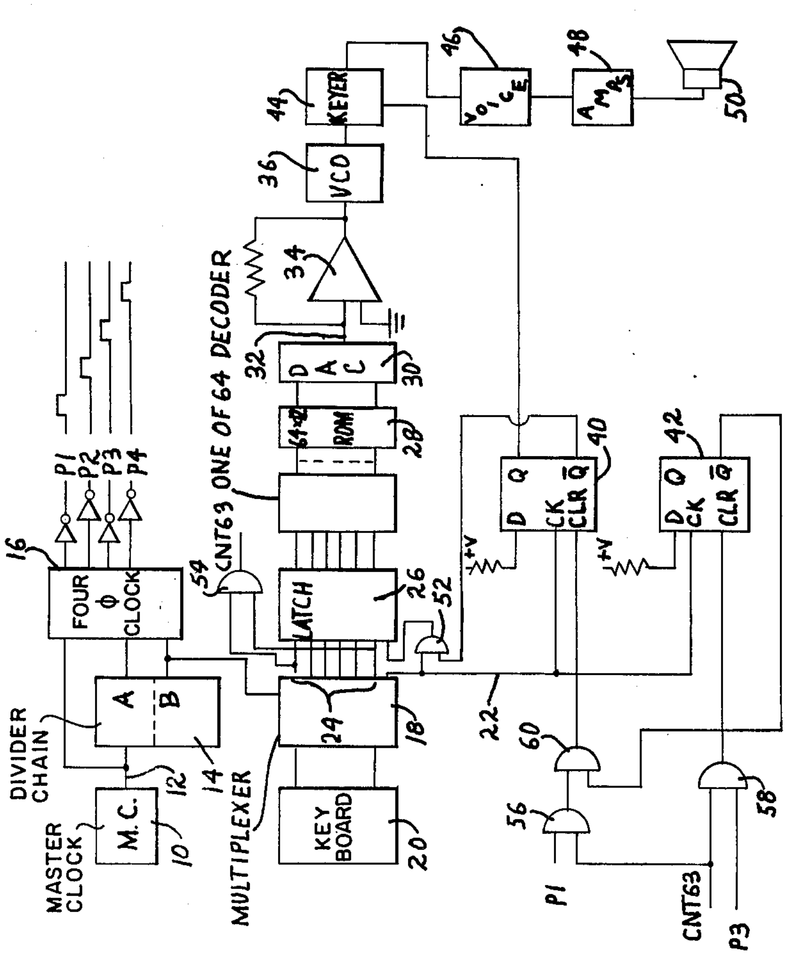
FIG. 1 is a simplified schematic view illustrating the use of the circuit of the present invention in a monophonic system.

Referring to the drawings somewhat more in detail, in FIG. 1, master clock 10 supplies a train of high frequency clock pulses to wire 12. Wire 12 is connected to a two stage divider chain 14, and to one input of a four phase clock generator 16. Divider 14 produces an output A which is a signal of one-half the frequency of the pulses on wire 12, and an output B which is a signal of one-fourth the frequency of the pulses on wire 12. Outputs A and B of divider chain 14 are connected to two further inputs of four phase clock 16.

Four phase clock 16 produces time displaced pulses P1, P2, P3 and P4, as indicated in FIG. 1, with one pulse occurring at each output during one full cycle of the B output of divider chain 14.

Output B of divider chain 14 is also connected as the clocking input to keyboard multiplexer 18. Multiplexer 18 electronically scans the sixty-one key keyboard 20 in one direction, for example, from top to bottom, in a fashion well known in the art to supply a data stream to wire 22. The data stream supplied to wire 22 consists of time displaced logic signals with the signals corresponding to depressed keys appearing in respective time slots of the data stream.

More specifically, the data stream will contain a pulse at logic level 1 for each key on the keyboard that is depressed and a pulse at logic level 0 for each key of the keyboard which is not depressed. The data stream thus stays at logic level 0 except when a depressed key is encountered during a keyboard scan.

Multiplexer 18 produces a respective six bit digital word as it scans each key of keyboard 20. The six bit word produced by multiplexer 18 is supplied to the six wires indicated in FIG. 1 at 24, and connected to the D inputs of the six bit latch 26. The multiplex data stream on wire 22 is connected to the clocking inputs of the aforesaid latch, and any key down signals (positive going pulses) contained in the data stream will cause the latch to transfer the six bit word at the D inputs thereof to the Q outputs thereof.

The Q outputs of latch 26 are connected to the addressing inputs of a sixty-four line, twelve bit read only memory 28. The outputs of read only memory 28 are connected to the digital inputs of a digital to analog converter (DAC) 30. DAC 30 will produce an analog current output at terminal 32 for each digital input thereto.

An operational amplifier 34 is connected to terminal 32 to convert the current output of DAC 30 to a voltage, which is connected to the control terminal of a voltage controlled oscillator (VCO) 36. VCO 36 is biased so that the frequency generated at terminal 38 for each digital word input to DAC 30 corresponds to the correct frequency for an eight foot signal corresponding to the key depressed on keyboard 20.

The multiplexed data stream on wire 22 is also connected to the clocking inputs of D type flip flops 40 and 42.

A key down signal in the multiplex data stream will cause the logic 1 signal permanently connected to the D input to each of flip flops 40 and 42 to be transferred to the Q outputs therof. The Q output of flip flop 40 is connected to keyer 44, and a logic 1 signal at the output of flip flop 40 is operable to enable keyer 44 to pass the frequency generated by VCO 36 to voicing circuits 46, amplifier 48 and speaker means 50.

The $\overline{Q}$ output of flip flop 40, which goes to logic 0 when the Q output of flip flop 40 goes to logic 1, is connected to one input of an AND gate 52, the other input of which is connected to wire 22. AND gate 52 prevents any key down signals in the multiplex data stream on wire 22 after flip flop 40 receives a clocking signal from wire 22 from clocking latch 26, and thereby creates a priority system wherein only the highest key depressed on the keyboard will deliver a clocking signal to latch 26.

The six wire output 24 from multiplexer 18 is also connected to the inputs of a six input AND gate 54. AND gate 54 forms a count sixty-three decode circuit and produces a positive pulse for the length of one period of the B output of divider chain 14 after all of the keys of keyboard 20 have been scanned. The count sixty-three pulse from gate 54 is connected to one input each of AND gates 56 and 58. The P1 pulse from four phase clock 16 is connected to the second input of AND gate 56 and the P3 pulse from four phase clock 16 is connected to the second input of AND gate 58. Accordingly, AND gate 56 will produce a positive pulse at its output terminal during the first quarter of the count 63 pulse, and AND gate 58 will produce a positive pulse at its output during the third quarter of the count 63 pulse.

The output of AND gate 56 is connected to one input of AND gate 60. The $\overline{Q}$ output of flip flop 42 is connected to the second input of AND gate 60, while the output of AND gate 60 is connected to the clear input of flip flop 40.

During any multiplexing cycle during which any key on keyboard 20 was depressed, the key down signal in the multiplex data stream on wire 22 will provide a clocking pulse to flip flop 42 and the inverted Q output, or $\overline{Q}$ output of flip flop 42 will be at logic zero, thus disabling AND gate 60, and preventing the pulse at the output of AND gate 56 from clearing flip flop 40.

The pulse from AND gate 58 will clear flip flop 42, and establish a logic 1 level at the inverted Q output thereof. During any multiplexing cycle in which no keys are depressed on the keyboard, the logic 1 signal previously established at the inverted Q output of flip flop 42 will allow the pulse from AND gate 56 to pulse the clear terminal of flip flop 40, thus establishing a logic 0 at the Q output thereof, and disabling, or shutting off, keyer 44.

When flip flop 40 is cleared, a logic 1 signal will be established at the inverted Q, or $\overline{Q}$, output thereof, and AND gate 52 will once again be enabled to pass a key down pulse in the multiplex data stream or wire 22 to latch 26.

In operation, latch 26 will contain the six bit binary word corresponding to the highest key on keyboard 20 which is depressed at any time. The output of latch 26 will cause the VCO 36, through read only memory 28 and DAC 30, to produce a frequency corresponding to the depressed key. Flip flops 40 and 42 function to assure that keyer 44 will be enabled for at least one full keyboard scan for each key down signal received from the data stream on wire 22 and for the length of time the respective key is depressed.

This assures that even keys on the lower end of the keyboard when depressed will produce a continuous audible tone until released, or until a key in a higher position along the keyboard is depressed.

FIG. 2 shows the circuit as described in FIG. 1, and modified to include the simultaneous sounding of up to four notes. The six bit output 24 from multiplexer 18 is connected to the D inputs to each of four latches 26A, 26B, 26C and 26D, respectively. Each of latches 26A, through D, is connected to a respective ready only memory 28A through respective digital to analog converters 30A through 30D, 28D, and through respective amplifiers 34A to 34D and respective voltage controlled oscillators 36A to 36D to respective keyers 44A through 44D, forming four parallel paths, each of which operates in a manner identical to the circuit as described in FIG. 1.

The outputs of keyers 44A through 44D, are connected together and are connected to the input of amplifier 46. Similarly, flip flops 40A and 42A through 40D and 42D perform the keyer enable function for keyers 44A through 44D, respectively.

Shift register 62 is initialized by AND gates 56 and 58 at the beginning of each multiplexed cycle to provide a logic 1 signal at the output marked A, and logic 0 signals at outputs B through D, respectively. Outputs A through D of shift register 62 are connected to one input each of AND gates 64 through 67, respectively.

Key down information on wire 22 is supplied to AND gates 68 and 70 together with the P1 and P3 clock pulses, respectively, from four phase clock 16, to provide two time displaced pulses during each key down signal on wire 22. The first said time displaced pulse is connected to the second input of each of AND gates 64 through 67, while the second time displaced pulse is connected to the shifting input of shift register 62. The outputs of AND gates 64 through 67 are connected to the clocking inputs of latches 26A through 26D, and to the clocking inputs of flip flops 40A and 42A through 40D and 42D, respectively.

In this manner, the first key down signal occurring on wire 22 during each multiplex cycle will first produce a clocking pulse to latch 26A and to flip flops 40A and 42A and will then produce a pulse at the shifting input to shift register 62.

When the shifting input to shift register 62 is pulsed, the logic 1 signal contained in bit A will be shifted to bit B and a logic zero signal will be shifted into bit A. This will then establish an enabling signal to AND gate 65 and a disabling signal to each of AND gates 64, 66 and 67 so that a second key down signal occurring on wire 22 will develop a clocking pulse to latch 26B and to flip flops 40B and 42B.

Similarly, third and fourth key down signals on wire 22 will produce clocking pulses to latches 26C and 26D, respectively.

In this manner, it is possible to control up to four, or more, VCO circuits during each scan of the keyboard.

Thus, by expanding the length of shift register 62, and including appropriate VCO circuits and keyer enable latches for each bit in shift register 62, any number of depressed keys can be handled during each scan of the keyboard.

Figure 3:
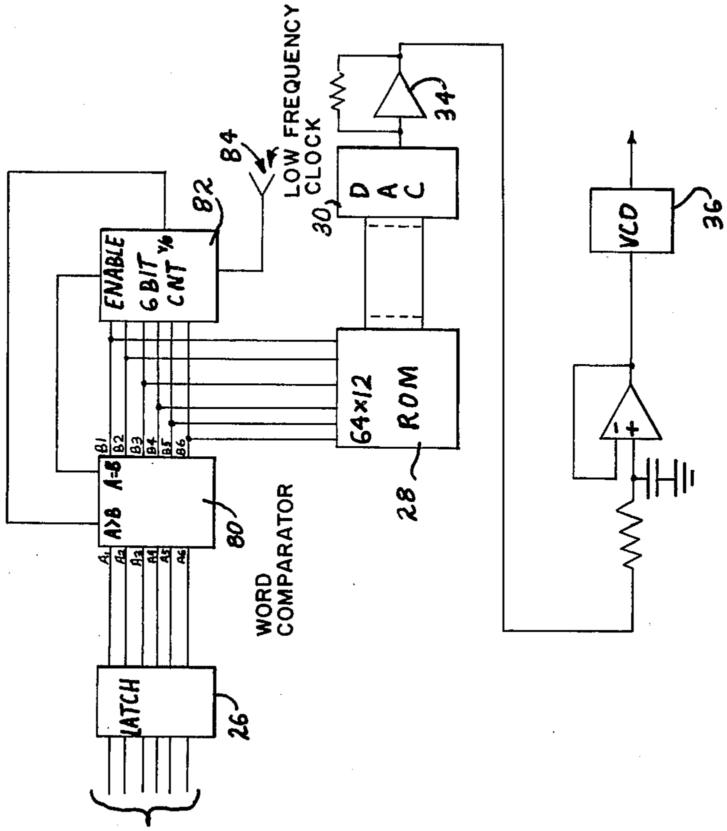
FIG. 3 shows a modification.

Referring to FIG. 3, a six bit binary word comparator 80 has been inserted in the address lines to the read only memory 28 between latch 26 and read only memory 28. Also a six bit binary up/down counter 82 has been connected to the address lines and has control terminals connected to the comparator.

The six bit output from latch 26 forms the input to word comparator 80 at the A1 through A6 inputs. The B1 through B6 inputs of word comparator 80 are connected to a six bit output of counter 82, and are also connected to the addressing inputs of read only memory 28.

Comparator 80 supplies an output to the A equals B terminal whenever the six bit word at the A inputs is equal to the six bit word at the B inputs, and presents an output to the A greater than B output whenever the six bit word at the A inputs is greater than the six bit word at the B inputs.

More specifically, when the two binary word inputs are equal, the output at the A equal B output will be at logic level 1. Whenever the binary word at the A inputs is greater than the binary word at the B inputs, the A greater than B output will be at logic 1, and whenever the binary word at the A inputs is less than, or equal to, the binary word at the B inputs, the A greater than B output will be at logic 0.

The A equals B output from comparator 80 is connected to the enable input of counter 82, and the A-greater-than-B output is connected to the count up/-count down control terminal on counter 82. Whenever the A equal to B output from comparator 80 is equal to logic 0, counter 82 will be enabled to count. Whenever the logic level at the A greater than B output of comparator 80 is equal to logic 1, counter 82 will be enabled to count in the up direction, and whenever the A greater than B output of comparator 80 is equal to logic 0, counter 82 will be enabled to count in the down direction.

Whenever a key on the organ keyboard is depressed, comparator 80 will compare the binary word corresponding to that key to the binary word output from counter 82. If the two binary words are equal the A equal to B output will be established at logic 1, and counter 82 will be disabled. Whenever the binary word corresponding to the depressed key is different from the binary word output from counter 82 the logic level on the A greater than B output from comparator 80 will cause counter 82 to count in the direction so as to bring the B inputs to comparator 80 equal to the A inputs thereof.

The six bit output from counter 82 is also connected to the addressing inputs of read only memory 28. Whenever a new key is depressed on the keyboard, the output of counter 82 will move in single count increments from the binary word corresponding to the key previously depressed to the binary word corresponding to the key presently depressed.

As the six bit addressing input to read only memory 28 counts in conformity with counter 82, the twelve bit output of read only memory 28, and, therefore, the analog output of DAC 30 and the voltage output of amplifier 34, will cause VCO 36 to change frequency from the key previously depressed to the key presently depressed in a smooth manner, thus simulating a portamento effect.

The rate at which counter 82 counts is controlled by a portamento clock input 84. Portamento clock 84 is of a relatively low frequency, substantially lower than the frequency of the tone signals produced by VCO 36. Portamento clock 84 can also, for convenience, be of a variable frequency, and under control of the player, so as to provide a variable speed portamento effect.

It should be noted, of course, that the portamento effect can also be added in the polyphonic system.

In order to reduce the number of read only memories required, a time sharing scheme has been developed, and which is shown in FIG. 4.

As can be seen in FIG. 4, the outputs of each of latches 26A through 26D are connected to the inputs of sampling latches 86A through 86D. As in the circuit of FIG. 2, latches 26A through 26D will contain a six bit word corresponding to from one to four keys depressed on the keyboard. Latches 86A through 86D will be sequentially enabled by the outputs of the four line demultiplexer 88.

Each of latches 86A through 86D, when enabled, will transfer the six bit word at the input thereof to the six bit output thereof, and, when disabled, will establish a logic 1 level at each output thereof. The outputs of each of latches 86A through 86D are wire OR'd together, and form a single six bit word which is connected to the addressing input of the 64 by twelve bit read only memory 28.

Demultiplexer 88 will sequentially enable each of the four outputs thereof in response to the two bit binary word input thereto from a counter 90, which is clocked by a time sharing clock input 92. Time sharing clock 92 is of a frequency sufficiently high to allow each of latches 86A through 86D to be enabled at least once during each complete multiplexing cycle.

Read only memory 28, DAC 30, and operational amplifier 34, operate as previously described to produce an analog voltage which is buffered by operational amplifier 94. The output of amplifier 94 is connected to the source terminal of each of four field effect transistors (FET) 96A through 96D.

The drain terminals of the field effect transistors 96A through 96D are connected to the inputs of respective operational amplifiers 98A through 98D, each of which is connected as a voltage follower. Also connected to the input terminal of each of amplifiers 98A through 98D connected to ground via is a respective capacitor 100A through 100D.

Each of the four outputs of demultiplexer 88 is connected to a first input of a respective one of four two input OR gates indicated at 102, with the second input of each of the OR gates being connected to the time sharing clock 92. The output of each of OR gates 102 is connected to the gating input to each of FET's 96A through 96D.

In operation, as demultiplexer 88 sequentially enables each of latches 86A through 86D, the enabling signal supplied by demultiplexer 88 will be combined with time sharing clock 92 by the appropriate one of OR gates 102 and supplied to the gating terminal of one of FET's 96A through 96D.

The enabling signal thus provided will pulse to a logic 0 level during the last half of the enabling signal supplied to latches 86A through 86D.

The gating terminal of each of FET's 96A through 96D performs the function of controlling the resistance between the source terminal and the drain terminal thereof. Whenever a logic 1 signal is supplied to the gating terminal of any of the FETs the resistance between the source terminal and the drain terminal thereof will be high, and whenever a logic 0 signal is supplied to the gating terminal of any of the FETs, the resistance between the source terminal and the drain terminal thereof will be low.

As demultiplexer 88 sequentially enables each of latches 86A through 86D, the gating terminal of each of FET's 96A through 96D will be pulsed to logic 0.

Specifically, the gating terminal of FET 96A will be pulsed to logic 0 during the last half of the enabling pulse supplied to latch 86A.

Similarly, FETs 96B, C and D will be pulsed during the latter portion of the enabling signals supplied to latches 86B, C and D, respectively.

When latch 86A is enabled, the six bit word at the input terminals thereof will be transferred to the output terminals thereof, which are connected to the addressing inputs of read only memory 28. The six bit word thus established at the addressing inputs of read only memory 28 develops a twelve bit word at the output terminals of read only memory 28, which, as previously described, will cause an analog voltage to be produced at the output of operational amplifier 34.

The output of operational amplifier 94 will be at the same voltage as the output of amplifier 34.

When the gating terminal of FET 96A is pulsed to logic level 0, and the resistance between the source terminal and the drain terminal thereof becomes low, the voltage at the output of amplifier 94 will be developed on capacitor 100A. When the signal at the gating terminal of FET 96A returns to logic 1, the resistance between the source terminal and the drain terminal of 96A will become high and the voltage developed on capacitor 100A will remain constant, since there is no path provided for said voltage to discharge.

In a similar manner, as each of latches 86B through 86D are sequentially enabled, the analog voltages produced by amplifier 34 will be developed on capacitors 100B, 100C and 100D, respectively.

The outputs of amplifiers 98A through 98D, respectively, are each connected to the controlling terminal of a voltage controlled oscillator 36A through 36D, respectively.

In this manner, a single read only memory 28 can be utilized to control a number of voltage controlled oscillators.

Also shown in FIG. 4, is a method of providing a vibrato signal to each of the VCO circuits controlled by read only memory 28.

Vibrato oscillators 104A through D are connected to the source terminals of respective ones of the field effect transistors 106A through 106D. The drain terminals of the transistors are connected to a control terminal for DAC 30. The gating terminals of the FETs 106A through 106D are connected to the gating terminals of FETs 96A through D, respectively, so that the output of vibrato oscillator 104A will be effective to control DAC 30 at the same time that FET 96A is in the low resistance state.

This allows the vibrato oscillator 104A to effect only the voltage applied, or impressed upon capacitor 100A. Similarly, vibrato oscillators 104B through 104D will effect only the voltage on capacitors 100B through 100D.

This provides for the possibility of providing a different vibrato to each of various notes played.

FIG. 5 shows a modification in which a celeste effect can be obtained. The circuit in FIG. 5 is a portion of the circuit of FIG. 1. Specifically, FIG. 5 includes the circuit of FIG. 1 from the operational amplifier 34 to the keyers 44, with the modification consisting of several VCO's controlled from the output of amplifier 34. Each of the VCO's in FIG. 5 is advantageously biased so as to operate with a slight difference in frequencies from the others of the VCO's. As the control voltage from amplifier 34 establishes a control voltage for a depressed key, each of the VCO's in FIG. 5 will oscillate very close to the appropriate nominal frequency of the respective tone, but with each VCO slightly detuned from the others to provide a celeste effect.

It will be appreciated that the method and circuitry described above provide a novel and advantageous arrangement for generating a range of frequencies, especially for electronic organs, in response to the actuation of control elements, such as the keys of an organ keyboard.

Modifications may be made within the scope of the appended claims.

What is claimed is:

1. A method of generating frequencies corresponding to a predetermined number of actuated ones of a plurality of independently actuatable elements which comprises; repetitively scanning said elements and generating a digital signal corresponding to each said element simultaneous with the scanning thereof, independently storing the digital signals corresponding to actuated ones of said elements during the period of actuation of the respective element, converting each stored digital signal to a respective voltage signal, and supplying the voltage signals simultaneously to the control terminals of respective voltage controlled oscillators.

2. The method according to claim 1 which includes varying the voltage level of each said voltage signal at vibrato frequency.

3. The method of operating an electronic organ having a keyboard and electroacoustic transducer means which comprises; scanning said keyboard in one direction and developing a data stream consisting of time displaced data bits in which key down signals corresponding to depressed keys appear in respective time slots, generating a respective digital word for each key simultaneously with the scanning of the respective keys, utilizing up to a predetermined number of said key down signals for storing the digital words corresponding to the respective keys during a scan of the keyboard and for the period of time the respective key is actuated, converting the stored digital words to respective voltage signals, varying the frequencies of respective voltage controlled oscillators simultaneously in conformity with said voltage signals, and supplying the outputs of said oscillators to said transducer means.

4. The method according to claim 3 which includes varying the voltage of each said voltage signal at vibrato frequency.

5. The method of operating an electronic organ having a keyboard and electroacoustic transducer means which comprises; scanning said keyboard in one direction and developing a data stream consisting of time displaced data bits in which key down signals corresponding to depressed keys appear in respective time slots, generating a respective digital word for each key simultaneously with the scanning of the respective keys, utilizing up to a predetermined number of the key down signals for independently storing the digital words corresponding to the respective keys of the keyboard as the said keys are addressed during a scan of the keyboard, retaining each stored digital word until the respective key is released, converting the stored digital words to respective voltage signals, varying the frequency of respective voltage controlled oscillators simultaneously in conformity with said voltage signals, and supplying the outputs of said oscillators to said transducer means.

6. An electronic organ having a keyboard with depressable keys, electroacoustic transducer means, frequency generating means, and keyers connecting said generating means to said transducer means, said frequency generating means comprising a plurality of voltage controlled oscillators, digital to analog converter means for supplying control voltages to said oscillators, multiplexing means and a driving clock therefor for scanning said keys sequentially in one direction of said keyboard, counter means driven by the clock for developing a respective digital word simultaneously with the scanning of each key, a plurality of latches each having inputs to which said digital words are supplied substantially simultaneously with the development thereof, memory means interposed between the output sides of said latches and said converter means, and means for clocking a respective one of said latches for each depressed key up to the number of said latches which is encountered during a scan of said keyboard.

7. An electronic organ according to claim 6 in which said memory means includes multibit memory means interposed between the output sides of said latches and said converter means.

8. An electronic organ according to claim 7 in which said memory means comprises a memory for each latch.

9. An electronic organ according to claim 7 in which said memory means comprises a single memory for all of said latches and said converter means comprises a single converter for all of said oscillators, and time sharing means comprising means for sampling the outputs of said latches sequentially and supplying the samples to said memory while simultaneously supplying the converter output to a respective oscillator.

10. An electronic organ according to claim 8 which includes varying the voltage at the input of each oscillator at a predetermined frequency.

11. An electronic organ according to claim 9 which includes varying the voltage at the input of each oscillator at a predetermined frequency.

12. An electronic organ having a keyboard with depressable keys, electroacoustic transducer means, frequency generating means, and keyers connecting said generating means to said transducer means, said frequency generating means comprising at least two voltage controlled oscillators connected in parallel, digital to analog converter means having the output side connected to said voltage controlled oscillators so that variation of the voltage at the output of said converter means will cause the output frequency of said oscillators to vary, means for developing a digital word corresponding to each key of the keyboard, and means for supplying the digital word corresponding to a depressed key of the keyboard to the input side of said digital to analog converter means, said oscillators being slightly detuned to create a celeste effect.

13. The method of operating an electronic organ having a keyboard and electroacoustic transducer means which comprises; scanning said keyboard in one direction and developing a data stream consisting of time displaced data bits in which key down signals corresponding to depressed keys appear in respective time slots, generating a respective digital word for each key simultaneously with the scanning of the respective keys, utilizing at least one said key down signal for storing the digital word corresponding to the respective key during a scan of the keyboard, developing a voltage signal in conformity with the stored digital word, supplying the voltage signal to a plurality of voltage controlled oscillators, supplying the outputs of said oscillators to said transducer means, and slightly detuning the oscillators relative to one another to produce a celeste effect.

14. An electronic organ having a keyboard with depressable keys, electroacoustic transducer means, frequency generating means, and keyers connecting said generating means to said transducer means, said frequency generating means comprising at least one voltage controlled oscillator, digital to analog converter means having the output side connected to said voltage controlled oscillator so that variation of the voltage at the output of said converter means will cause the output frequency of said oscillator to vary, means for developing a digital word corresponding to each key of the keyboard, and means for supplying the digital word corresponding to a depressed key of the keyboard to the input side of said digital to analog converter means, said means for developing a digital word corresponding to each said key including a multibit memory connected to the input side of said digital to analog converter means, means for scanning said keys sequentially in one direction of the keyboard, means for generating a primary digital word for each key simultaneously with the scanning thereof, latch means having inputs to which said primary digital words are sequentially presented and having outputs, a word comparator and a counter having outputs and a clock input and a pair of control terminals, said comparator having inputs connected to the outputs of said latch means and said counter, said counter outputs also being connected to the addressing inputs of said multibit memory, said comparator developing a first signal when the words at the respective inputs differ which is supplied to one control terminal of said counter to enable the counter to count and developing a second signal when the words at the respective inputs are the same which is supplied to the other control terminal of said counter to disable the counter from counting, and means for supplying clocking pulses to the clock input of said counter at a predetermined rate so the depression of a key which develops a digital word different from what is in the counter will produce an arpeggio.

15. An electronic organ according to claim 14 which includes RC network means between said digital to analog converter means and said voltage controlled oscillator to cause the frequency of said voltage controlled oscillator to change gradually when the word supplied to said digital to analog converter means changes.

16. An electronic organ having a keyboard with depressable keys, electroacoustic transducer means, frequency generating means, and keyers connecting said generating means to said transducer means, said frequency generating means comprising at least one voltage controlled oscillator, digital to analog converter means having the output side connected to said voltage controlled oscillator so that variation of the voltage at the output of said converter means will cause the output frequency of said oscillator to vary, means for developing a digital word corresponding to each key of the keyboard, latch means connected to receive and store the word corresponding to a depressed key, a word comparator having first inputs connected to the output side of said latch means and second input terminals, a counter having output terminals connected to said second input terminals and to the input side of said digital to analog converter means, said comparator having means to develop a first signal when the word inputs thereto are different and a second signal when the word inputs thereto are the same, said counter having an enabling terminal connected to receive said first signal and a disabling terminal connected to receive said second signal, and means for clocking said counter at a predetermined rate.

17. The method of playing a series of notes which change in pitch in one direction progressively on an electronic organ which comprises: developing a digital word corresponding to a depressed key, comparing the word to a previously developed word corresponding to a different key, counting with counting means from the previously developed word toward the second developed word at a predetermined rate, and sounding a respective note for each count of the counting means.

18. The method of operating an electronic organ to develop glissando or portamento when playing at least one keyboard and in respect of which keyboard successive multibit digital words are developed in response to the depression of the keys of the keyboard in succession commencing at one end of the keyboard while the depression of each key results in the sounding of a respective tone, said method comprising; depressing a first key to develop a first digital word and storing the first word, depressing second key to develop a second digital word, comparing the stored first word with the second word, modifying said stored word into successive intervening words toward said second word, and causing a respective tone to sound for each said word commencing with the stored word.

19. The method according to claim 18 which includes storing said first word in a counter, clocking the counter at a predetermined rate, enabling the counter to count in the direction toward said second word in response to depression of said second key, and interrupting the clocking of the counter when the word stored therein is equal to the said second word.

20. In an electronic organ having a keyboard and sound producing means, means for developing successive digital words in response to the depression of successive keys of the organ keyboard, a word comparator having first inputs to which the digital words developed by the depression of keys of the keyboard are supplied and also having second inputs, a counter having terminals connected to said second inputs and having a clock input, an enabling input and a control input for controlling the direction of counting of the counter, said word comparator having a first output terminal which supplies a control signal to said enabling input when the words at the comparator input are unequal and a second output terminal which supplies signals to said control input of said counter to cause the counter to count toward said second word when the counter is enabled, and means operable in response to the development of words at the counter terminals for causing said sound producing means to cause respective tones to sound.

21. A method of generating frequencies corresponding to a predetermined number of actuated ones of a plurality of independently actuatable elements which comprises; repetitively scanning said elements and generating a digital signal corresponding to each said element simultaneous with the scanning thereof, independently storing the digital signals corresponding to actuated ones of said elements during the period of actuation of the respective element, sequentially and repetitively addressing said stored digital signals and simultaneously developing voltages corresponding thereto, and supplying each said voltage as developed to the control terminal of a respective voltage controlled oscillator.

22. The method according to claim 21 which includes connecting capacitor means to the control terminal of each oscillator to prevent the voltage thereof from changing suddenly in the intervals between successive supplies of the respective developed voltage thereto.

23. The method according to claim 21 which includes varying said developed voltages at respective vibrato rates.

* * * * *